Oct. 8, 1929.  W. A. YOUNG  1,731,186
PUTTY SPREADER
Filed Aug. 18, 1927
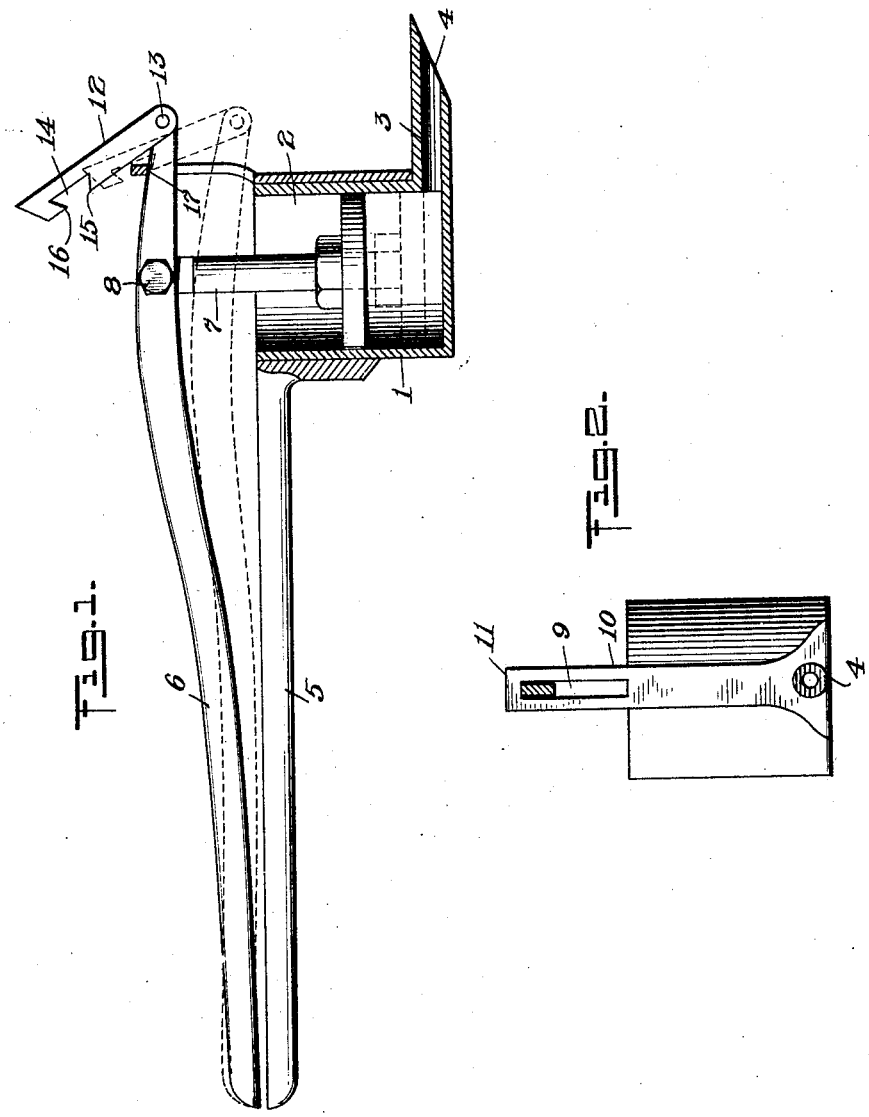
Inventor
William A. Young
By his Attorney Patented Oct. 8, 1929

1,731,186

UNITED STATES PATENT OFFICE

WILLIAM A. YOUNG, OF ASTORIA, NEW YORK

PUTTY SPREADER

Application filed August 18, 1927. Serial No. 213,780.

This invention relates to a device for spreading plastic material.

An object of the invention resides in the provision of a device by means of which a plastic material such, for instance, as putty may be distributed from a bulk supply and simultaneously spread.

A further object of the invention resides in so constructing the device that it may be made relatively small to facilitate its use and yet so that it may contain a sufficient quantity of the plastic material to make its use practical.

In the drawings:

Figure 1 is a side elevation of a device constructed in accordance with my invention, part thereof being shown in section; and Figure 2 is an end elevation of the same with the operating lever shown in section.

The embodiment of the invention illustrated in the drawings includes the reservoir 1 which is preferably, though not necessarily, of cylindrical form, and open at one end, as at 2. From the other end of the reservoir an outlet 3 for the plastic material is located. This outlet is so formed that it, in addition to serving as an outlet for the plastic material, acts as a spreader for the material. This spreading action is accomplished because of the fact that the end of the outlet is chamfered, resulting in a spreading edge 4.

A stationary handle 5 extends from the reservoir 1. A relatively movable lever 6 has a plunger 7 pivotally attached thereto between its ends 8. The end of the lever 6 which projects beyond the pivot point 8 protrudes through a slot 9 in a guide 10 which slot is closed at its upper end by a bar 11.

A swinging strut 12 which is pivoted to the end of the lever 6 at 13 is provided with a recess 14 adjacent to the end remote from the pivot point, which recess results in shoulders 15 and 16. The shoulder 15 is adapted to engage the lower edge of the bar 11 as indicated in dotted lines in Figure 1, while the shoulder 16 is adapted to engage the upper end of this bar.

In operation, when the handle portion of this lever is moved towards the handle 5 with the plunger 7 located within and at the upper part of the reservoir 1, the upper edge of the lever 6, at 17, engages the lower edge of the bar 11 and acts as a fulcrum for the lever. When, however, the plunger 7 has completed part of its travel into the reservoir, the handle end of the lever 6 engages the stationary handle 5. The handle portion of the lever 6 is then raised about the pivot 8 until the shoulder 15 on the strut 12 engages the lower edge of the bar 11 at which time this shoulder 15 acts as an anchor for the lever and permits the lever to again be forced towards the handle 5 to complete the movement of the plunger 7 to the bottom of the reservoir 1.

Then, when it is desired to remove the plunger 7 from the reservoir 1 to refill the latter, the bar 11 is engaged by the shoulder 16, and the lever moved about the pivot 8 to withdraw the plunger from the reservoir.

It is to be noted that the shoulders 15 and 16 are inclined so that when they engage the respective edges of the bar 11, they will maintain the strut 12 in engagement with the bar.

The creation of successive fulcrum points for the lever 6 enables the operator to force all of the plastic material from the reservoir and yet makes it possible to separate the lever 7 from the handle 5 to such a minor degree that it will not interfere with the manipulation of the tool in spreading the material. This is because of the fact that the lever need be separated from the handle but a short distance upon each successive movement of the plunger into the reservoir.

What I claim is:

In a device of the class described, the combination with a receptacle having a plunger operable therein and having an outlet, of a lever pivotally attached to said plunger, intermediate the ends thereof, a bar fixed with relation to the receptacle, and a strut pivoted to the lever at the short end thereof and having shoulders adapted to successively engage the opposite edges of the bar whereby the lifting force on the plunger is multiplied.

WILLIAM A. YOUNG.